(12) United States Patent
Tseng et al.

(10) Patent No.: US 10,768,477 B2
(45) Date of Patent: Sep. 8, 2020

(54) BACKLIGHT MODULE

(71) Applicant: Unique Materials Co., Ltd., Taipei (TW)

(72) Inventors: Huan-Wei Tseng, Taipei (TW);
Chia-Chun Hsieh, Taipei (TW);
Chun-Wei Chou, Taipei (TW)

(73) Assignee: Unique Materials Co., Ltd., Taipei (TW)

( * ) Notice: Subject to any disclaimer, the term of this patent is extended or adjusted under 35 U.S.C. 154(b) by 381 days.

(21) Appl. No.: 15/853,974

(22) Filed: Dec. 26, 2017

(65) Prior Publication Data

US 2018/0120638 A1 May 3, 2018

Related U.S. Application Data

(63) Continuation-in-part of application No. 15/193,187, filed on Jun. 27, 2016, now Pat. No. 10,047,288.

(51) Int. Cl.
| | | |
|---|---|---|
| *G02F 1/13357* | (2006.01) | |
| *G02F 1/1335* | (2006.01) | |
| *F21V 8/00* | (2006.01) | |
| *C09K 11/02* | (2006.01) | |

(52) U.S. Cl.
CPC ........ *G02F 1/133602* (2013.01); *C09K 11/02* (2013.01); *G02B 6/0031* (2013.01); *G02F 1/133553* (2013.01); *G02F 1/133603* (2013.01); *G02F 1/133615* (2013.01); *G02F 2001/133614* (2013.01)

(58) Field of Classification Search
CPC ............ G02B 6/0031; G02F 1/133602; G02F 1/133607; G02F 1/33614; G02F 1/33615
See application file for complete search history.

(56) References Cited

U.S. PATENT DOCUMENTS

| | | |
|---|---|---|
| 2012/0001217 A1 | 1/2012 | Kang et al. |
| 2017/0130035 A1 | 5/2017 | Kataoka et al. |

FOREIGN PATENT DOCUMENTS

| | | | |
|---|---|---|---|
| JP | 2013533352 | | 8/2013 |
| JP | 2015069142 | | 4/2015 |
| JP | 2016003277 | | 1/2016 |
| JP | 2017078120 | | 4/2017 |
| JP | 2017-120319 | * | 7/2017 |
| JP | 2017120319 | | 7/2017 |
| WO | 2013021971 | | 3/2015 |

OTHER PUBLICATIONS

Translation for JP 2017-120319, Jul. 6, 2017.*

* cited by examiner

*Primary Examiner* — C Melissa Koslow
(74) *Attorney, Agent, or Firm* — JCIPRNET (57) ABSTRACT

Provided is a backlight module including a light guide plate, a light source and a light conversion layer. The light source is disposed at one side of the light guide plate. The light conversion layer is disposed over the light guide plate. The light conversion layer includes an optical composite material including 0.1 wt % to 15 wt % of a luminescent material and 85 wt % to 99.9 wt % of an acrylate-based polymer. The acrylate-based polymer is prepared from precursors including 5 wt % to 30 wt % of a surfactant having a thiol group.

15 Claims, 3 Drawing Sheets

BACKLIGHT MODULE

CROSS-REFERENCE TO RELATED APPLICATIONS

This application is a continuation-in-part application of and claims the priority benefit of U.S. application Ser. No. 15/193,187, filed on Jun. 27, 2016, now allowed. The entirety of the above-mentioned patent application is hereby incorporated by reference herein and made a part of this specification.

BACKGROUND OF THE INVENTION

Field of the Invention

The invention relates to an optical module, particularly to a backlight module.

Description of Related Art

Quantum dots are very small semiconductor nanostructures that are invisible to the naked eye. When quantum dots are stimulated by light, the quantum dots emit colored light, and the color of the colored light is determined by component materials, size and shape of the quantum dots. Such characteristic enables the quantum dots to change a color of light emitted by a light source. In recent years, quantum dot-containing polymer composite materials have been widely used in fields of backlight modules of display devices and illumination, etc.

As luminous efficacy of the quantum dots is easily affected by external environmental factors such as strong light, high temperature, moisture, oxygen, volatile substances and so on, maintaining long-term stability is the biggest challenge for application of the quantum dots. That is, when the quantum dots are applied in the fields of backlight modules of display devices, illumination and so on, the problem of lacking in long-term stability will be inevitable. Therefore, how to improve the long-term stability of quantum dots has become an important topic.

SUMMARY OF THE INVENTION

The invention provides a backlight module having a light conversion layer with quantum dots therein. The light conversion layer includes an optical composite material which reduces fluorescence quenching of quantum dots due to degradation induced by external environmental factors and improves the stability of the quantum dots, thus prolonging service life of the backlight module.

The invention provides a backlight module including a light guide plate, a light source and a light conversion layer. The light source is disposed at one side of the light guide plate. The light conversion layer is disposed over the light guide plate. The light conversion layer includes an optical composite material including 0.1 wt % to 15 wt % of a luminescent material and 85 wt % to 99.9 wt % of an acrylate-based polymer. The acrylate-based polymer is prepared from precursors including 5 wt % to 30 wt % of a surfactant having a thiol group.

In one embodiment of the invention, the surfactant has at least two thiol groups.

In one embodiment of the invention, the surfactant is a compound represented by formula (I), formula (II) or formula (III) below:

wherein $R_1$, $R_2$, $R_3$, $R_4$, $R_5$ and $R_6$ are the same as or different from one another, and are independently selected from the group consisting of hydrogen, $C_1$ to $C_{20}$ alkyl, $C_2$ to $C_{20}$ alkenyl, $C_2$ to $C_{20}$ alkynyl, $C_1$ to $C_{20}$ hydroxy alkyl, $C_1$ to $C_{20}$ alkyl ester, $C_2$ to $C_{20}$ alkyl ketone, $C_1$ to $C_{20}$ alkyl thioether and $C_1$ to $C_{20}$ alkoxy, and at least two of $R_1$ to $R_6$ have a thiol group.

In one embodiment of the invention, at least two of $R_1$ to $R_6$ are $C_1$ to $C_{20}$ alkyl having a thiol group.

In one embodiment of the invention, at least two of $R_1$ to $R_6$ are $C_1$ to $C_{20}$ alkyl ester having a thiol group.

In one embodiment of the invention, at least two of $R_1$ to $R_6$ are $C_1$ to $C_{20}$ alkoxy having a thiol group.

In one embodiment of the invention, at least one thiol group of the surfactant participates in cross-linking.

In one embodiment of the invention, the surfactant has a molecular weight ranging from 100 to 1,000.

In one embodiment of the invention, the acrylate-based polymer is prepared from precursors including: 30 wt % to 50 wt % of a first acrylate monomer, 15 wt % to 30 wt % of a second acrylate monomer, 5 wt % to 20 wt % of a cross-linker, and 1 wt % to 2 wt % of an initiator.

In one embodiment of the invention, the optical composite material further includes particles selected from the group consisting of titanium dioxide, zinc oxide, zinc sulfide, silica, zirconium oxide, antimony trioxide, alumina, Lonsdaleite, diamond-like carbon, bismuth oxychloride (BiOCl), barium titanate, potassium lithium niobate, lithium niobate, lithium tantalate, proustite, polyfluoroolefin, polycarbonate, polystyrene, and a combination thereof.

In one embodiment of the invention, the luminescent material is dispersed and embedded in the acrylate-based polymer. The luminescent material includes quantum dots.

In one embodiment of the invention, the light conversion layer includes the optical composite material in direct contact with and cured between two substrate sheets without a gas barrier for protection.

In one embodiment of the invention, the substrate sheets are polyethylene terephthalate (PET) substrates.

In one embodiment of the invention, the light conversion layer is in direct contact with the light guide plate.

In one embodiment of the invention, the light source is disposed on a side surface of the light guide plate to form an edge-lit structure.

In one embodiment of the invention, the light guide plate has a light entering surface, and haze of the light guide plate gradually increases from a side adjacent to the light entering surface to a side away from the light entering surface.

In one embodiment of the invention, the light source is disposed on a bottom surface of the light guide plate to form a direct-lit structure.

In one embodiment of the invention, the backlight module further includes a reflective layer disposed below the light guide plate to reflect light emitted by the light source into the light conversion layer.

Based on the above, a backlight module of the invention includes a light conversion layer. The light conversion layer includes an optical composite material that includes a luminescent material having quantum dots, an acrylate-based polymer, and the acrylate-based polymer prepared from precursors including a surfactant having a thiol group. The thiol group may interact with the quantum dots to form an optical composite material having improved stability. Therefore, the light conversion layer of the invention may effectively block external environmental factors such as moisture, oxygen, volatile substances and so on, thereby improving the stability of the quantum dots. In other words, in the backlight module of the invention, there is no need for the light conversion layer to include gas barrier layers (e.g., diamond-like carbon thin film, silicon oxide layer, titanium oxide layer, aluminum oxide layer, silicon nitride layer or the like), and there is also no need to interpose a gas barrier between the light conversion layer and the light guide plate, and the stability of the quantum dots can still be prevented from being affected by external environmental factors. Thus, the service life of the backlight module is prolonged.

In addition, since the backlight module of the invention does not need any gas barrier, manufacturing costs of the invention are reduced, and products may thus become more commercially competitive.

In order to make the aforementioned and other features and advantages of the invention more comprehensible, several embodiments accompanied with figures are described in detail below.

DETAILED DESCRIPTION OF DISCLOSED EMBODIMENTS

The invention is illustrated more comprehensively referring to the drawings of the embodiments. However, the invention may be embodied in many different forms and should not be construed as limited to the embodiments set forth herein. Thicknesses of layers and regions in the drawings may be enlarged for clarity. The same or similar reference numerals represent the same or similar components, and are not repeated in the following paragraphs.

Figure 1:
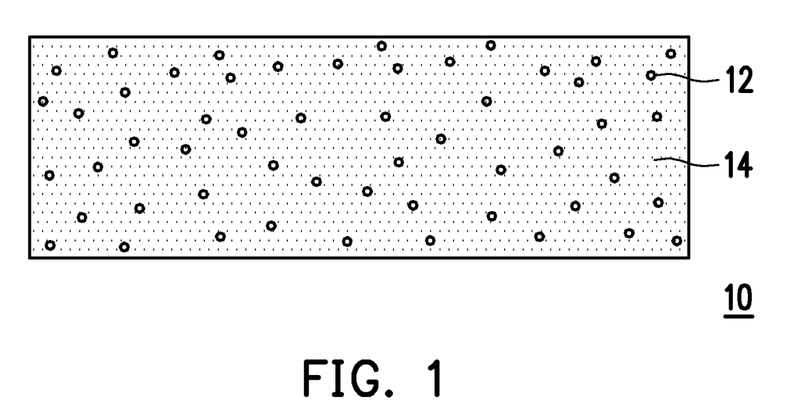
FIG. 1 is a schematic view of an optical composite material according to one embodiment of the invention.
Figure 2:
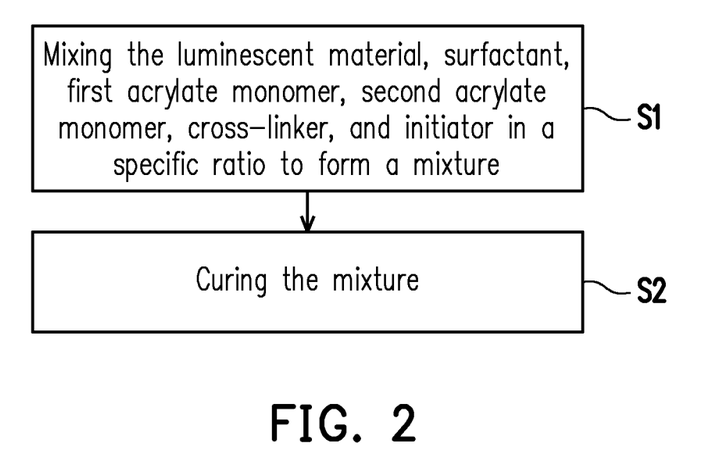
FIG. 2 is a flowchart of a method for foil ling an optical composite material according to one embodiment of the invention.

FIG. 1 is a schematic view of an optical composite material according to one embodiment of the invention. FIG. 2 is a flowchart of a method for forming an optical composite material according to one embodiment of the invention.

Referring to FIG. 1 and FIG. 2, step S1 is performed, in which the components listed in table are mixed together to form a mixture. Then, step S2 is performed, in which the mixture is cured to form an optical composite material 10. As shown in FIG. 1, the optical composite material 10 includes a luminescent material 12 dispersed and embedded in an acrylate-based polymer 14.

In one embodiment, a method for curing the mixture includes a roll-to-roll process in which the mixture is filled between two polyethylene terephthalate (PET) substrates, followed by irradiation with ultraviolet light to form an optical film. However, the invention is not limited thereto. In alternative embodiments, the mixture may be dotted onto a chip, followed by irradiation with ultraviolet light to form a dot-shaped optical structure. In other embodiments, the mixture may be filled into a hollow tube, followed by irradiation with ultraviolet light to form a columnar optical structure. That is, depending on actual needs, the optical composite material 10 of the present embodiment may have different shapes or structures, such as a dot-shaped structure, a linear structure, a film-like structure, a cubic structure, a cylindrical structure, a triangular prism-like structure, a hemispherical structure, or a combination thereof.

The optical composite material 10 will be described in detail with reference to FIG. 1.

In one embodiment, the content of the luminescent material 12 is 0.1 wt % to 15 wt %. The luminescent material 12 includes a luminescent nanomaterial such as quantum dots. Specifically, the quantum dots have a core, a core-shell, a core-multishell, a core-alloy layer-shell, a core-alloy layer-multishell structure, or a combination thereof. Particle size or dimension of the quantum dots may be adjusted according to needs (e.g., to emit visible lights of different colors), and the invention is not limited thereto.

In one embodiment, said "core" may be, for example, at least one selected from the group consisting of CdS, CdSe, CdTe, ZnS, ZnSe, ZnTe, HgS, HgSe, HgTe, GaN, GaP, GaAs, InP, InAs, InSb, AlN, AlP, AlAs, AlSb, SiC, Fe, Pt, Ni, Co, Al, Ag, Au, Cu, FePt, Si, Ge, PbS, PbSe, PbTe and alloys thereof. In one embodiment, said "shell" is, for example, at least one selected from the group consisting of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe and alloys thereof. Said core or said shell may be selected according to different needs, and the invention is not limited thereto.

In one embodiment, the content of the acrylate-based polymer 14 is 85 wt % to 99.9 wt %. Specifically, the acrylate-based polymer 14 is prepared from precursors including: 30 wt % to 50 wt % of a first acrylate monomer, 15 wt % to 30 wt % of a second acrylate monomer, 5 wt % to 30 wt % of a surfactant having a thiol group, 5 wt % to 20 wt % of a cross-linker, and 1 wt % to 2 wt % of an initiator. In alternative embodiments, the content of the surfactant is less than the content of the first acrylate monomer.

In one embodiment, the first acrylate monomer may have a molecular weight ranging from 100 to 1,000. The first acrylate monomer may be selected from the group consisting of methyl methacrylate, ethyl methacrylate, isopropyl methacrylate, n-butyl methacrylate, isobutylmethacrylate, tert-butyl methacrylate, n-amyl methacrylate, isoamyl methacrylate, n-hexyl methacrylate, tridecyl methacrylate, stearyl methacrylate, decyl methacrylate, dodecyl methacrylate, methoxydiethylene glycol methacrylate, polypropylene glycol monomethacrylate, phenylmethacrylate, phenoxyethyl methacrylate, tetrahydrofurfuryl methacrylate, tert-butylcyclohexyl methacrylate, behenyl methacrylate, dicyclopentanyl methacrylate, dicyclopentenyloxyethyl methacrylate, 2-ethylhexylmethacrylate, octyl methacrylate, isooctylmethacrylate, n-decyl methacrylate, isodecyl methacrylate, lauryl methacrylate, hexadecyl methacrylate, octadecyl methacrylate, benzyl methacrylate, 2-phenylethylrnethacrylate, 2-phenoxyethyl acrylate, cyclic trimethylolpropane formal acrylate, cyclohexyl methacrylate, and 4-tert-butylcyclohexylacrylate. However, the invention is not limited thereto. In other embodiments, a suitable acrylate monomer may be selected based on the literature according to different needs.

In one embodiment, the second acrylate monomer may have a molecular weight ranging from 200 to 10,000. The second acrylate monomer is, for example, neopentyl glycol propoxylate diacrylate, diethylene glycol dimethacrylate, 1,6-hexanedioldiacrylate, 1,6-hexanediol dimethacrylate, 1,12-dodecanediol dimethacrylate, triallyl isocyanurate, or polyethylene glycoldimethacrylate. However, the invention is not limited thereto. In other embodiments, a suitable acrylate oligomer may be selected based on the literature according to different needs.

In one embodiment, the surfactant has at least two thiol groups. In other embodiments, the surfactant may be a compound having multi-thiol groups.

In alternative embodiments, the surfactant is a compound represented by formula (I), formula (II) or formula (III) below:

wherein $R_1$, $R_2$, $R_3$, $R_4$, $R_5$ and $R_6$ are the same as or different from one another, and are independently selected from the group consisting of hydrogen, $C_1$ to $C_{20}$ alkyl, $C_2$ to $C_{20}$ alkenyl, $C_2$ to $C_{20}$ alkynyl, $C_1$ to $C_{20}$ hydroxy alkyl, $C_1$ to $C_{20}$ alkyl ester, $C_2$ to $C_{20}$ alkyl ketone, $C_1$ to $C_{20}$ alkyl thioether and $C_1$ to $C_{20}$ alkoxy, and at least two of $R_1$ to $R_6$ have a thiol group.

In one embodiment, $C_1$ to $C_{20}$ alkyl may be linear or branched alkyl. Examples of the $C_1$ to $C_{20}$ alkyl include methyl, ethyl, propyl, n-butyl, isobutyl, pentyl, hexyl, heptyl, or the likes; however, the invention is not limited thereto.

In one embodiment, $C_2$ to $C_{20}$ alkenyl may be linear or branched alkenyl. Examples of the $C_2$ to $C_{20}$ alkenyl include ethenyl, propenyl, butenyl, pentenyl, hexenyl, heptenyl, or the likes; however, the invention is not limited thereto.

In one embodiment, $C_2$ to $C_{20}$ alkynyl may be linear or branched alkynyl. Examples of the $C_2$ to $C_{20}$ alkynyl include ethynyl, propynyl, butynyl, pentynyl, hexynyl, heptynyl, or the likes; however, the invention is not limited thereto.

In one embodiment, $C_1$ to $C_{20}$ hydroxy alkyl may be linear or branched hydroxy alkyl. Examples of the $C_1$ to $C_{20}$ hydroxy alkyl include hydroxy methyl, hydroxy ethyl, hydroxy propyl, hydroxy butyl, hydroxy pentyl, hydroxy hexyl, hydroxy heptyl, or the likes; however, the invention is not limited thereto.

In one embodiment, $C_1$ to $C_{20}$ alkyl ester may be linear or branched alkyl ester. Examples of the $C_1$ to $C_{20}$ alkyl ester include methyl methanoate, methyl ethanoate, ethyl propanoate, ethyl butanoate, methyl pentanoate, methyl hexanoate, methyl heptanoate, or the likes; however, the invention is not limited thereto.

In one embodiment, $C_2$ to $C_{20}$ alkyl ketone may be linear or branched alkyl ketone. Examples of the $C_2$ to $C_{20}$ alkyl ketone include ethyl propanone, ethyl butanone, methyl pentanone, methyl hexanone, methyl heptanone, methyl octanone or the likes; however, the invention is not limited thereto.

In one embodiment, $C_1$ to $C_{20}$ alkyl thioether may be linear or branched alkyl thioether. Examples of the $C_1$ to $C_{20}$ alkyl thioether include dimethylsulfanyl, diethylsulfanyl, ethylpropylsulfanyl, methyl butylsulfanyl, butylsulfanyl, methyl pentylsulfanyl, methyl hexylsulfanyl, methyl heptylsulfanyl or the likes; however, the invention is not limited thereto.

In one embodiment, $C_1$ to $C_{20}$ alkoxy may be linear or branched alkoxy. Examples of the $C_1$ to $C_{20}$ alkoxy include methoxy, ethoxy, propoxy, butoxy, pentyloxy, hexyloxy, heptyloxy, or the likes; however, the invention is not limited thereto.

In another embodiment, the surfactant is represented by the above formula (I), formula (II) or formula (III), wherein at least two of $R_1$ to $R_6$ are $C_1$ to $C_{20}$ alkyl having a thiol group. For example, $R_1$ and $R_2$ are both $C_1$ to $C_{20}$ alkyl having a thiol group; $R_1$, $R_2$ and $R_3$ are all $C_1$ to $C_{20}$ alkyl having a thiol group; $R_1$, $R_2$, $R_3$ and $R_4$ are all $C_1$ to $C_{20}$ alkyl having a thiol group; $R_1$, $R_3$, $R_4$ and $R_6$ are all $C_1$ to $C_{20}$ alkyl having a thiol group; or $R_1$, $R_4$, $R_5$ and $R_6$ are all $C_1$ to $C_{20}$ alkyl having a thiol group.

In still another embodiment, the surfactant is represented by the above formula (I), formula (II) or formula (III), wherein at least two of $R_1$ to $R_6$ are $C_1$ to $C_{20}$ alkyl ester having a thiol group. For example, $R_1$ and $R_2$ are both $C_1$ to $C_{20}$ alkyl ester having a thiol group; $R_1$, $R_2$ and $R_3$ are all $C_1$ to $C_{20}$ alkyl ester having a thiol group; $R_1$, $R_2$, $R_3$ and $R_4$ are all $C_1$ to $C_{20}$ alkyl ester having a thiol group; $R_1$, $R_3$, $R_4$ and $R_6$ are all $C_1$ to $C_{20}$ alkyl ester having a thiol group; or $R_1$, $R_4$, $R_5$ and $R_6$ are all $C_1$ to $C_{20}$ alkyl ester having a thiol group.

In alternative embodiments, the surfactant is represented by the above formula (I), formula (II) or formula (III), wherein at least two of $R_1$ to $R_6$ are $C_2$ to $C_{20}$ alkyl ketone having a thiol group. For example, $R_1$ and $R_2$ are both $C_2$ to $C_{20}$ alkyl ketone having a thiol group; $R_1$, $R_2$ and $R_3$ are all $C_2$ to $C_{20}$ alkyl ketone having a thiol group; $R_1$, $R_2$, $R_3$ and $R_4$ are all $C_2$ to $C_{20}$ alkyl ketone having a thiol group; $R_1$, $R_3$, $R_4$ and $R_6$ are all $C_2$ to $C_{20}$ alkyl ketone having a thiol group; or $R_1$, $R_4$, $R_5$ and $R_6$ are all $C_2$ to $C_{20}$ alkyl ketone having a thiol group.

In other embodiments, the surfactant is represented by the above formula (I), formula (II) or formula (III), wherein at least two of $R_1$ to $R_6$ are $C_1$ to $C_{20}$ alkyl thioether having a thiol group. For example, $R_1$ and $R_2$ are both $C_1$ to $C_{20}$ alkyl thioether having a thiol group; $R_1$, $R_2$ and $R_3$ are all $C_1$ to $C_{20}$ alkyl thioether having a thiol group; $R_1$, $R_2$, $R_3$ and $R_4$ are all $C_1$ to $C_{20}$ alkyl thioether having a thiol group; $R_1$, $R_3$, $R_4$ and $R_6$ are all $C_1$ to $C_{20}$ alkyl thioether having a thiol group; or $R_1$, $R_4$, $R_5$ and $R_6$ are all $C_1$ to $C_m$ alkyl thioether having a thiol group.

In other embodiments, the surfactant is represented by the above formula (I), formula (II) or formula (III), wherein at least two of $R_1$ to $R_6$ are $C_1$ to $C_{20}$ alkoxy having a thiol group. For example, $R_1$ and $R_2$ are both $C_1$ to $C_{20}$ alkoxy having a thiol group; $R_1$, $R_2$ and $R_3$ are all $C_1$ to $C_{20}$ alkoxy having a thiol group; $R_1$, $R_2$, $R_3$ and $R_4$ are all $C_1$ to $C_{20}$ alkoxy having a thiol group; $R_1$, $R_3$, $R_4$ and $R_6$ are all $C_1$ to $C_{20}$ alkoxy having a thiol group; or $R_1$, $R_4$, $R_5$ and $R_6$ are all $C_1$ to $C_{20}$ alkoxy having a thiol group.

In specific embodiments, the surfactant may be a compound selected from the group consisting of 1,3-propanedithiol, 2,2'-thiodiethanethiol, 1,3-benzenedithiol, 1,3-benzenedimethanethiol, glycol dimercaptoacetate, trimethylolpropane trimercaptoacetate, tris [2-(3-mercaptopropionyloxy)ethyl]isocyanurate; however, the invention is not limited thereto.

In one embodiment, the surfactant has a molecular weight ranging from 100 to 1,000. In alternative embodiments, the surfactant has a molecular weight ranging from 100 to 500.

It is worth noting that, the surfactant may improve the resistance of the luminescent material 12 (e.g., quantum dots) to external environmental factors. In addition, the surfactant has a plurality of thiol groups, and not all of the thiol groups interact with the quantum dots. The thiol groups not interacting with the quantum dots may cross-link with other compounds in the optical composite material 10. Thus, a more stable optical film can be formed. In other words, in the present embodiment, a portion of the thiol groups of the surfactant interact with the quantum dots, while the remaining portion of the thiol groups of the surfactant cross-link with other compounds. Therefore, compared to a conventional optical composite material (which uses an amine compound), the optical film formed in the present embodiment has improved stability. Therefore, even if the optical film is irradiated with light or contacts external interfering factors, such as water, moisture, oxygen or the like, the external interfering factors do not affect the efficacy of the optical film. Thus, the need for a barrier material is effectively eliminated.

In one embodiment, the cross-linker may be, but is not limited to, a suitable acrylic-based compound having a molecular weight ranging from 100 to 2,000. Examples of the cross-linker include 4-hydroxybutyl acrylate, 4-hydroxybutyl acrylate glycidylether, diallyl phthalate, 1,4-cyclohexane dimethanol monoacrylate, trimethallyl isocyanurate, and [2 [1,1-dimethyl-2-[(1-oxoallyl)oxy]ethyl]-5-ethyl-1,3-dioxan-5-yl]methyl acrylate.

In one embodiment, the initiator may be a photoinitiator or a thermal initiator. In the present embodiment, the example used in the optical composite material 10 may be a photoinitiator. That is, the optical composite material 10 of the present embodiment may be obtained within the minimum curing time simply by irradiation with light. In other embodiments, examples of the initiator include, but not limited to, benzoin ethers, benzyl ketals, a-dialkoxy-acetophenones, a-amino-alkylphenones, acylphosphine oxides, benzophenones, thioxanthones, titanocenes, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoylformate, oxy-phenyl-acetic acid, 2-[2 oxo-2 phenyl-acetoxy-ethoxy]-ethyl ester, oxy-phenyl-acetic 2-[2-hydroxy-5 ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, and diphenyl(2,4,6-trimethylbenzoyl)phosphine oxide.

In one embodiment, the optical composite material 10 further includes particles with a content of less than the sum content of the luminescent material 12 and the acrylate-based polymer 14. The particles are selected from the group consisting of titanium dioxide, zinc oxide, zinc sulfide, silica, zirconium oxide, antimony trioxide, alumina, Lonsdaleite, diamond-like carbon, bismuth oxychloride (BiOCl), barium titanate, potassium lithium niobate, lithium niobate, lithium tantalate, proustite, polyfluoroolefin, polycarbonate, polystyrene, and a combination thereof. The particles may have a particle size ranging from 1 μm to 30 μm. The particles may be used to scatter incident light and to increase the chance of the incident light reacting with the luminescent material 12, thereby enhancing absorption and conversion efficiency of the luminescent material 12 for the incident light. The particles may also be used to scatter emitted light and to increase the chance of the emitted light interacting with a surface of the optical composite material 10 (e.g., optical film), thereby enhancing the luminous efficiency of the optical composite material 10.

The invention further provides an optical film including: 0.1 wt % to 15 wt % of a luminescent material, 5 wt % to 30 wt % of a surfactant at least two thiol groups, 30 wt % to 50 wt % of a first acrylate monomer, 15 wt % to 30 wt % of second acrylate monomer, 5 wt % to 20 wt % of a cross-linker, and 1 wt % to 2 wt % of an initiator.

Figure 3:
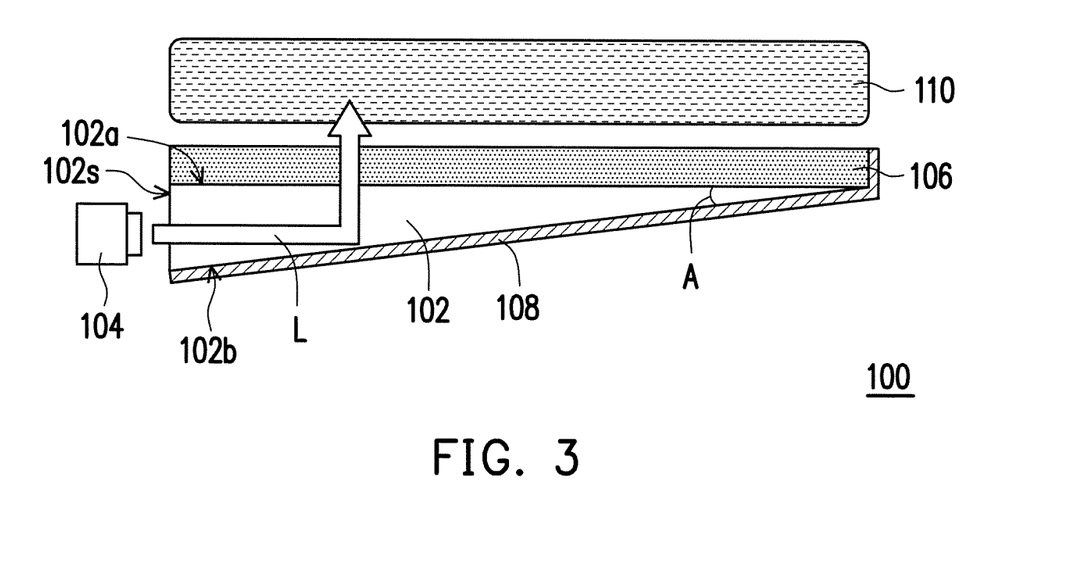
FIG. 3 is a schematic cross-sectional view of a backlight module according to a first embodiment of the invention.

FIG. 3 is a schematic cross-sectional view of a backlight module according to a first embodiment of the invention.

Referring to FIG. 3, a backlight module 100 of the present embodiment includes a light guide plate 102, a light source 104, a light conversion layer 106 and a reflective layer 108. The light guide plate 102 has a light exiting surface 102a, a back surface 102b and a light entering surface 102s, wherein the light exiting surface 102a is opposite the back surface 102b, and the light entering surface 102s is connected between the light exiting surface 102a and the back surface 102b. In one embodiment, as shown in FIG. 3, the light guide plate 102 has a triangular shape in cross-section, and an acute angle A is formed between the light exiting surface 102a and the back surface 102b of the light guide plate 102. In alternative embodiments, the light guide plate 102 may also have a rectangular shape, a trapezoidal shape or other suitable shape in cross-section. In one embodiment, the light guide plate 102 may be transparent plastic, glass or a material capable of guiding light. In alternative embodiments, the light guide plate 102 may be poly(methyl methacrylate) (PMMA), polycarbonate (PC), polyethylene terephthalate (PET), polyimide (PI) or other suitable material. In other embodiments, the haze of the light guide plate 102 gradually increases from a side adjacent to the light entering surface 102s to a side away from the light entering surface 102s. Herein, "haze" refers to a percentage of light that deviates from the incident beam by greater than 2.5 degrees when passing through a transparent medium, and can be used for the evaluation of a light scattering state of a transparent medium. That is, the higher the haze of the transparent medium, the lower the gloss and the transparency thereof. In contrast, the lower the haze of the transparent medium, the higher the gloss and the transparency thereof.

The light source 140 is placed next to the light entering surface 102s of the light guide plate 102 to form an edge-lit structure. In one embodiment, the light source 104 may be a light emitting diode (LED) or other suitable light emitting device. The light source 104 may emit white light or light (e.g., blue light, red light, etc.) having a specific wavelength. In the case of blue light, for example, blue light L emitted by the light source 104, after entering the light guide plate 102, is transmitted within the light guide plate 102 through total reflection of the light guide plate 102, and then passes through the light exiting surface 102a to reach the light conversion layer 106. Next, the blue light L emitted by the light source 104 is partially converted into red light and green light by the light conversion layer 106, so that the blue light L, the red light and the green light are mixed together to form white light, which is then transmitted to a liquid crystal panel 110 above the light conversion layer 106. The composition and arrangement of the liquid crystal panel 110 are well-known to persons of ordinary skill in the optics field, and will not be described in detail herein.

The light conversion layer 106 is disposed on the light exiting surface 102a of the light guide plate 102. Specifically, the light conversion layer 106 includes the optical composite material 10. The details of the optical composite material 10 have been described in the previous paragraphs and will not be repeated. In one embodiment, a method for forming the light conversion layer 106 may be as follows. For example, the optical composite material 10 is coated onto the light exiting surface 102a of the light guide plate 102 and then cured. Thus, the light conversion layer 106 is only composed of the cured optical composite material 10 directly in contact with the light guide plate 102. However, the invention is not limited thereto. In other embodiments, the optical composite material 10 may be shaped and cured between two substrate sheets (e.g., PET substrates) by a roll-to-roll process or by a mold filling method, so as to form the light conversion layer 106. That is, the light conversion layer 106 may include two PET substrates and the optical composite material 10 sandwiched between (or in direct contact with) the two PET substrates. The light conversion layer 106 is then disposed on the light exiting surface 102a of the light guide plate 102.

It is worth mentioning that, since the optical composite material 10 can effectively block the external environmental factors such as moisture, oxygen, volatile substances and so on, there is no need for the light conversion layer 106 including the optical composite material 10 to include any gas barrier layers (e.g., a diamond-like carbon thin film, a silicon oxide layer, a titanium oxide layer, an aluminum oxide layer, a silicon nitride layer or the like) and there is also no need to interpose any gas barrier between the light conversion layer 106 and the light guide plate 102. In other words, the light conversion layer 106 of the present embodiment may prevent stability of the quantum dots from being affected by the external environmental factors, thus prolonging the service life of the backlight module 100. In addition, without the need for a gas barrier, the invention may reduce the manufacturing costs, thus making the products more competitive.

The reflective layer 108 is disposed on the back surface 102b of the light guide plate 102, so as to reflect the light L emitted by the light source 104 into the light conversion layer 106, thereby enhancing luminous efficacy of the light conversion layer 106. In one embodiment, a material of the reflective layer 108 includes a reflective metallic material, and examples thereof include gold, silver, copper or other suitable metallic material. Although FIG. 3 illustrates that the reflective layer 108 is only disposed on the back surface 102b of the light guide plate 102 and on one side of the light conversion layer 106, the invention is not limited thereto. In other embodiments, the reflective layer 108 may cover the light source 104, the light entering surface 102s of the light guide plate 102, and the other side of the light conversion layer 106, so as to prevent leakage of the light L.

Figure 4:
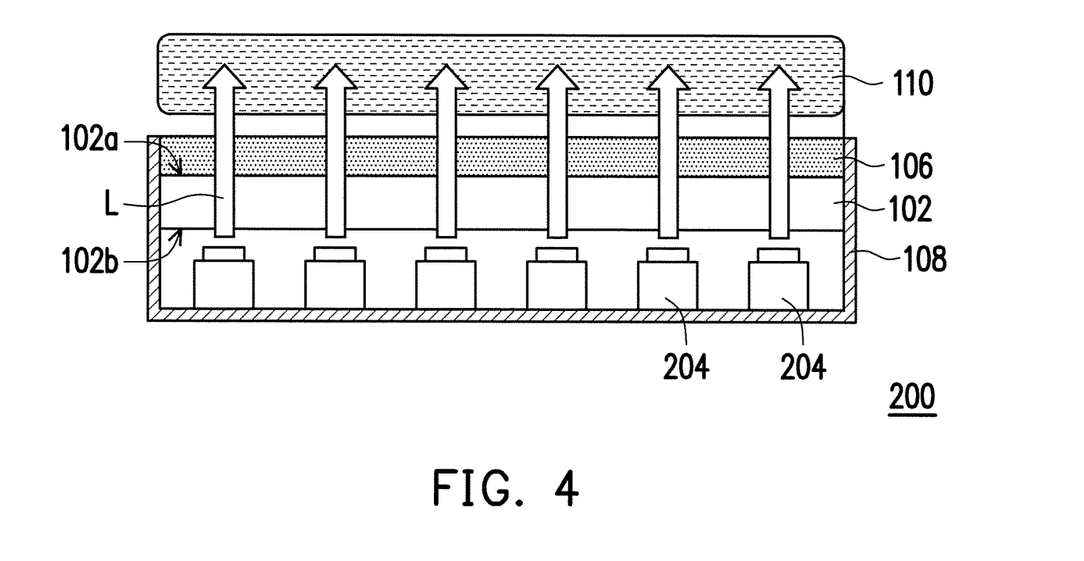
FIG. 4 is a schematic cross-sectional view of a backlight module according to a second embodiment of the invention.

FIG. 4 is a schematic cross-sectional view of a backlight module according to a second embodiment of the invention.

Referring to FIG. 4, a backlight module 200 of the second embodiment is similar to the backlight module 100 of the first embodiment. A difference between the above two lies in that a light source 204 of the backlight module 200 is disposed on the back surface 102b of the light guide plate 102 to form a direct-lit structure.

Experiment examples of the invention are mentioned below to more specifically describe the invention. However, the materials, methods used and so on as shown in the following experiment examples may be suitably modified without departing from the spirit of the invention. Therefore, the scope of the invention should not be interpreted in a limiting sense using the experiment examples shown below.

Experiment Example 1

Firstly, all the components in Table 1 were mixed together to form a mixture. The mixture was then subjected to ultrasonic vibration in the dark for 30 minutes to 90 minutes, so that CdSe/ZnS quantum dots were uniformly dispersed in the mixture. Then, the mixture was filled between two polyethylene terephthalate (PET) substrates, followed by irradiation with ultraviolet light (370 nm, 400 W, 1 minute) to form an optical film.

TABLE 1

| Luminescent material | Surfactant | First acrylate monomer | Second acrylate monomer | Cross-linker | Initiator |
|---|---|---|---|---|---|
| CdSe/ZnS | Tris[2-(3-mercapto-propionyloxy)ethyl]isocyanurate | 2-phenylethyl methacrylate | Neopentyl glycol propoxylate diacrylate | [2[1,1-dimethyl-2-[(1-oxoallyl)oxy]ethyl]-5-ethyl-1,3-dioxan-5-yl]methylacrylate | Diphenyl(2,4,6-trimethylbenzoyl)-phosphine oxide |
| 5% | 13% | 49% | 16% | 16% | 1% |

Experiment Example 2

In Experiment Example 2, the preparation method of the optical composite material was the same as the method described in Experiment Example 1 except that the components of the optical composite material and their proportions were different from those in Experiment Example 1.

The components of the optical composite material of Experiment Example 2 and their proportions were as shown in Table 2 below.

TABLE 2

| Luminescent material | Surfactant | First acrylate monomer | Second acrylate monomer | Cross-linker | Initiator |
|---|---|---|---|---|---|
| CdSe/ZnS | Glycol dimercapto acetate | 2-phenylethyl methacrylate | 1,6-hexanediol dimethacrylate | [2[1,1-dimethyl-2-[(1-oxoallyl)oxy]ethyl]-5-ethyl-1,3-dioxan-5-yl]methylacrylate | Diphenyl(2,4,6-trimethylbenzoyl)-phosphine oxide |
| 10% | 16% | 49% | 16% | 8% | 1% |

The above components were mixed together according to the proportions provided in Table 2. Then, the optical composite material was dotted onto a blue light (450 nm) LED chip, followed by irradiation with ultraviolet light (370 nm, 400 W, 3 minutes) to cure the optical composite material.

Experiment Example 3

In Experiment Example 3, the preparation method of the optical composite material was the same as the method described in Experiment Example 1 except that the components of the optical composite material and their proportions were different from those in Experiment Example 1.

The components of the optical composite material of Experiment Example 3 and their proportions were as shown in Table 3 below.

TABLE 3

| Luminescent material | Surfactant | First acrylate monomer | Second acrylate monomer | Cross-linker | Initiator |
|---|---|---|---|---|---|
| CdSe/ZnS | Trimethylolpropane-trimercapto-acetate | Cyclic trimethylolpropane formal acrylate | Triallyisocyanurate | Diallyl phthalate | Diphenyl(2,4,6-trimethylbenzoyl)-phosphine oxide |
| 15% | 15% | 38% | 24% | 6% | 2% |

A resultant mixture obtained by mixing the above components was filled into a transparent acrylic tube having an outer diameter of 16 mm and an inner diameter of 13 mm, followed by irradiation with ultraviolet light (370 nm, 400 W, 3 minutes) to cure the mixture.

From Experiment Examples 1 to 3, it is known that the optical composite material in the invention may be formed using different methods. Moreover, depending on actual needs, the optical composite material may have different shapes or structures, such as a dot-shaped structure, a linear structure, a film-like structure, a cubic structure, a cylindrical structure, a triangular prism-like structure, a hemispherical structure, or a combination thereof. In addition, after curing, an additional step of removing the cured optical composite material from the substrate or mold may be optionally performed.

Stability Test

To verify the stability of the optical composite material in a high temperature and high humidity environment, the optical composite material prepared by Experiment Example 1 was subjected to environmental testing. A prepared optical film was stored at 65° C. and a relative humidity of 95% for 1,000 hours. Luminance of the optical film in the backlight module was measured using a CS-100 Color and Luminance Meter (Konica Minolta) at the indicated time intervals.

Figure 5:
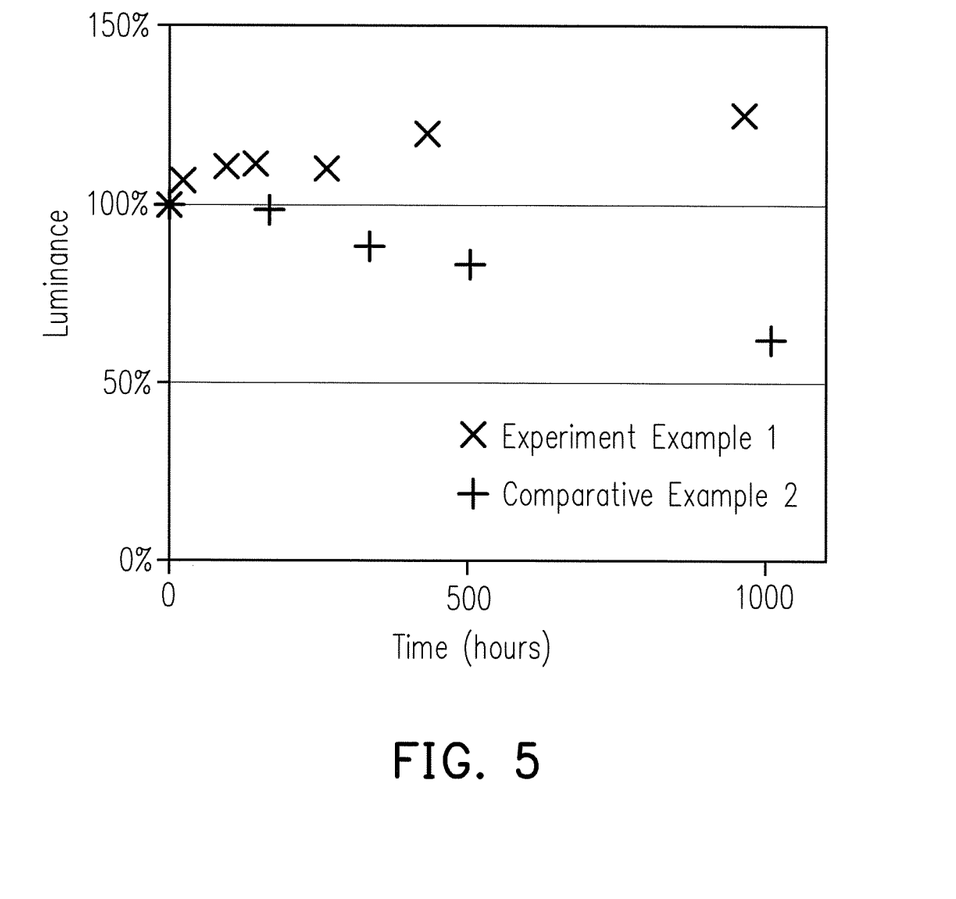
FIG. 5 illustrates a relationship between luminance and time of optical films of Experiment Example 1 and Comparative Example 2.

The test results of Experiment Example 1 were as shown in FIG. 5. FIG. 5 shows that even without the protection of barrier material against moisture or oxygen, the quantum dot-containing optical film of Experiment Example 1 exhibited no reduction in light emitting ability after being exposed to a high temperature and high humidity environment for about 1,000 hours. This demonstrated that the optical composite material of the invention may improve the stability of the quantum dots and/or eliminate the stability problem of the quantum dots without using a barrier material.

Comparative Example 1

As a control group, a commercially available quantum dot-containing optical film was also stored at 65° C. and a relative humidity of 95% for 1,000 hours. Since the commercially available quantum dot-containing optical film included gas barriers to protect the quantum dots, the commercially available quantum dot-containing optical film maintained its light emitting ability in the above environment (65° C. and a relative humidity of 95%) for at least 1,000 hours (results not disclosed in the invention).

Comparative Example 2

Two (upper and lower) gas barriers were removed from a commercially available quantum dot-containing optical film to obtain a commercially available quantum dot-containing optical film without the gas barriers. The commercially available quantum dot-containing optical film without gas barriers was stored at 65° C. and a relative humidity of 95% for 1,000 hours. Luminance of the optical film in the backlight module was measured using a CS-100 Color and Luminance Meter (Konica Minolta) at the indicated time intervals.

The test results of Comparative Example 2 were shown in FIG. 5. After being stored in a high temperature and high humidity environment for about 1,000 hours, the commercially available quantum dot-containing optical film without gas barriers exhibited a notable reduction in light emitting ability. This demonstrated that under the same condition without the protection provided by gas barriers, the stability of the optical composite material of the invention is better than the stability of the commercially available quantum dot-containing optical film.

Comparative Example 3

In order to test the influence of a surfactant having a thiol group on the properties of an optical composite material, an optical composite material having no surfactant was prepared (in the same manner as in Experiment Example 1, except that no surfactant was added), followed by irradiation with ultraviolet light (370 nm, 400 W) to cure the optical composite material. The CdSe/ZnS quantum dots of Experiment Example 1 were uniformly dispersed in the optical composite material including the surfactant, and the optical composite material was completely cured after being irradiated with ultraviolet light for 1 minute. In contrast, the CdSe/ZnS quantum dots of Comparative Example 3 failed to be uniformly dispersed in the optical composite material including no surfactant, and the optical composite material was still not completely cured after being irradiated with ultraviolet light for 1 hour. In other words, compared to the optical composite material including no surfactant in Comparative Example 3, the optical composite material including the surfactant in Experiment Example 1 had improved film forming ability and improved dispersibility of quantum dots.

In summary, a backlight module of the invention includes a light conversion layer. The light conversion layer includes an optical composite material that includes a luminescent material having quantum dots, an acrylate-based polymer, and the acrylate-based polymer prepared from precursors including a surfactant having a thiol group. The thiol group may interact with the quantum dots to form an optical film having improved stability. Therefore, the light conversion layer of the invention may effectively block external environmental factors such as moisture, oxygen, volatile substances and so on, thereby improving the stability of the quantum dots. In other words, in the backlight module of the invention, there is no need for the light conversion layer to include gas barrier layers (e.g., diamond-like carbon thin film, silicon oxide layer, titanium oxide layer, aluminum oxide layer, silicon nitride layer or the like), and there is also no need to interpose a gas barrier between the light conversion layer and the light guide plate, and the stability of the quantum dots can still be prevented from being affected by external environmental factors. Thus, the service life of the backlight module is prolonged.

In addition, since the backlight module of the invention does not need any gas barrier, manufacturing costs of the invention are reduced, and products may thus become more commercially competitive.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A backlight module, comprising:
    a light guide plate;
    a light source disposed at one side of the light guide plate; and
    a light conversion layer disposed over the light guide plate, wherein the light conversion layer comprises an optical composite material, and the optical composite material comprises:
    0.1 wt % to 15 wt % of a luminescent material; and
    85 wt % to 99.9 wt % of an acrylate-based polymer, wherein the acrylate-based polymer is prepared from precursors comprising:
    5 wt % to 30 wt % of a surfactant having a thiol group;
    30 wt % to 50 wt % of a first acrylate monomer;
    15 wt % to 30 wt % of a second acrylate monomer;
    5 wt % to 20 wt % of a cross-linker; and
    1 wt % to 2 wt % of an initiator.

2. The backlight module of claim 1, wherein the surfactant has at least two thiol groups.

3. The backlight module of claim 1, wherein the surfactant is a compound represented by formula (I), formula (II) or formula (III) below:

wherein $R_1$, $R_2$, $R_3$, $R_4$, $R_5$ and $R_6$ are the same as or different from one another, and are independently selected from the group consisting of hydrogen, $C_1$ to $C_{20}$ alkyl, $C_2$ to $C_{20}$ alkenyl, $C_2$ to $C_{20}$ alkynyl, $C_1$ to $C_{20}$ hydroxy alkyl, $C_1$ to $C_{20}$ alkyl ester, $C_2$ to $C_{20}$ alkyl ketone, $C_1$ to $C_{20}$ alkyl thioether and $C_1$ to $C_{20}$ alkoxy, and at least two of $R_1$ to $R_6$ have a thiol group.

4. The backlight module of claim 3, wherein at least two of $R_1$ to $R_6$ are $C_1$ to $C_{20}$ alkyl having a thiol group.

5. The backlight module of claim 3, wherein at least two of $R_1$ to $R_6$ are $C_1$ to $C_{20}$ alkyl ester having a thiol group.

6. The backlight module of claim 3, wherein at least two of $R_1$ to $R_6$ are $C_1$ to $C_{20}$ alkoxy having a thiol group.

7. The backlight module of claim 3, wherein at least one thiol group of the surfactant participates in cross-linking.

8. The backlight module of claim 1, wherein the surfactant has a molecular weight ranging from 100 to 1,000.

9. The backlight module of claim 1, wherein the optical composite material further comprises particles selected from the group consisting of titanium dioxide, zinc oxide, zinc sulfide, silica, zirconium oxide, antimony trioxide, alumina, Lonsdaleite, diamond-like carbon, bismuth oxychloride, barium titanate, potassium lithium niobate, lithium niobate, lithium tantalate, proustite, polyfluoroolefin, polycarbonate, polystyrene, and an arbitrary a combination thereof.

10. The backlight module of claim 1, wherein the luminescent material is dispersed and embedded in the acrylate-based polymer, and the luminescent material comprises quantum dots.

11. The backlight module of claim 1, wherein the light conversion layer comprises the optical composite material in direct contact with and cured between two substrate sheets without gas barrier for protection.

12. The backlight module of claim 1, wherein the light conversion layer is in direct contact with the light guide plate.

13. The backlight module of claim 1, wherein the light source is disposed on a side surface of the light guide plate to form an edge-lit structure.

14. The backlight module of claim 1, wherein the light source is disposed on a bottom surface of the light guide plate to form a direct-lit structure.

15. The backlight module of claim 1, further comprising:
a reflective layer disposed below the light guide plate to reflect light emitted by the light source into the light conversion layer.

* * * * *